US010282997B2

(12) United States Patent
Gignac et al.

(10) Patent No.: US 10,282,997 B2
(45) Date of Patent: May 7, 2019

(54) SYSTEM AND METHOD FOR GENERATING AND COMMUNICATING LANE INFORMATION FROM A HOST VEHICLE TO A VEHICLE-TO-VEHICLE NETWORK

(71) Applicant: Dura Operating, LLC, Auburn Hills, MI (US)

(72) Inventors: Donald Raymond Gignac, Waterford, MI (US); Aaron Evans Thompson, Grand Blanc, MI (US); Danish Uzair Siddiqui, Rochester Hills, MI (US); Rajashekhar Patil, Ypsilanti, MI (US); Gordon M. Thomas, Beverly Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 132 days.

(21) Appl. No.: 15/197,924

(22) Filed: Jun. 30, 2016

(65) Prior Publication Data

US 2017/0025018 A1  Jan. 26, 2017

Related U.S. Application Data

(60) Provisional application No. 62/194,359, filed on Jul. 20, 2015.

(51) Int. Cl.
| *G06K 9/00* | (2006.01) |
| *G08G 1/16* | (2006.01) |
| *H04L 29/08* | (2006.01) |
| *G06K 9/62* | (2006.01) |
| *H04N 7/18* | (2006.01) |

(52) U.S. Cl.
CPC .......... *G08G 1/167* (2013.01); *G06K 9/00798* (2013.01); *G06K 9/627* (2013.01); *G08G 1/161* (2013.01); *H04L 67/12* (2013.01); *H04N 7/181* (2013.01)

(58) Field of Classification Search
None
See application file for complete search history.

(56) References Cited

U.S. PATENT DOCUMENTS

| 6,370,475 | B1 | 4/2002 | Breed et al. | |
| 8,229,663 | B2 | 7/2012 | Zeng et al. | |
| 10,102,358 | B2 * | 10/2018 | Wilder | G06F 21/32 |
| 10,152,974 | B2 * | 12/2018 | Mozer | G10L 17/02 |
| 2004/0230373 | A1 * | 11/2004 | Tzamaloukas | G01C 21/28 |
| | | | | 701/468 |

(Continued)

FOREIGN PATENT DOCUMENTS

| EP | 1530186 A2 | 5/2005 |
| KR | 20150074750 A | 7/2015 |

*Primary Examiner* — Randolph I Chu
(74) *Attorney, Agent, or Firm* — Robert E. Ford; Raymond J. Vivacqua; Steven L. Crane

(57) ABSTRACT

A method of generating and communicating lane information from a host vehicle to a vehicle-to-vehicle (V2V) network includes collecting visual data from a camera, detecting a lane within the visual data, generating a lane classification for the lane based on the visual data, assigning a confidence level to the lane classification, generating a lane distance estimate from the visual data, generating a lane model from the lane classification and the lane distance estimate, and transmitting the lane model and the confidence level to the V2V network.

19 Claims, 3 Drawing Sheets

(56) References Cited

U.S. PATENT DOCUMENTS

| | | |
|---|---|---|
| 2007/0043502 A1 | 2/2007 | Mudalige et al. |
| 2010/1113351 | 8/2010 | Shuqing Zheng et al. |
| 2012/0314070 A1 | 12/2012 | Zhang et al. |
| 2013/0099941 A1* | 4/2013 | Jana ..................... H04W 4/023 340/905 |
| 2013/0278443 A1 | 10/2013 | Rubin et al. |
| 2015/0332590 A1* | 11/2015 | Salomonsson ......... G08G 1/167 701/28 |
| 2016/0321924 A1* | 11/2016 | Lewis .............. G08G 1/096791 |
| 2017/0032402 A1* | 2/2017 | Patsiokas ........... G06Q 30/0266 |
| 2017/0336801 A1* | 11/2017 | Shashua ............... G05D 1/0278 |

* cited by examiner

SYSTEM AND METHOD FOR GENERATING AND COMMUNICATING LANE INFORMATION FROM A HOST VEHICLE TO A VEHICLE-TO-VEHICLE NETWORK

CROSS REFERENCE TO RELATED APPLICATIONS

The present application claims the benefit of U.S. Provisional Patent application No. 62/194,359, filed on Jul. 20, 2015, the subject matter of which is incorporated herein by reference.

FIELD

The invention relates generally to a driver assistance system for motor vehicles, and more particularly to a driver assistance system for generating and communicating lane information from a host vehicle to a vehicle-to-vehicle (V2V) network.

BACKGROUND

The statements in this section merely provide background information related to the present disclosure and may or may not constitute prior art.

Motor vehicle sensing systems are known which can identify to a host vehicle other proximate motor vehicles and warn an operator of the host vehicle of the other vehicle's movements which may intersect the driving path of the host vehicle. Other motor vehicle sensing systems are known which can utilize data from geographic positioning systems (GPS) to identify to a host vehicle the host vehicle position on a road. GPS data may also be used by other proximate motor vehicles to determine the position of the proximate motor vehicles on the road. Yet other motor vehicle sensing systems are known which can utilize the data received from the above noted sensing systems and institute changes such as to reduce a host vehicle driving speed, apply brakes, provide audio and visual warning signals and the like.

However, GPS systems may have a positional error and cannot, on their own, accurately map surrounding vehicles as the locations of the lanes of the road are unknown to the GPS system. Therefore, there is a need in the art for a system and method for accurately generating and communicating lane information over V2V networks.

SUMMARY

In one aspect of the present invention, a method of generating and communicating lane information from a host vehicle to a vehicle-to-vehicle (V2V) network includes collecting visual data from a camera. The method further includes detecting a lane within the visual data. The method further includes generating a lane classification for the lane based on the visual data. The method further includes assigning a confidence level to the lane classification. The method further includes generating a lane distance estimate from the visual data. The method further includes generating a lane model from the lane classification and the lane distance estimate and transmitting the lane model and the confidence level to the V2V network.

In another aspect of the present invention, the camera of the method includes a front camera mounted to a front-facing surface of the host vehicle.

In yet another aspect of the present invention, detecting a plurality of lanes further includes determining a position, a width, a curvature, a topography, a distance of each of the plurality of lanes relative to a reference position on the host vehicle, and a color and a shape of a plurality of lane markers for the plurality of lanes.

In yet another aspect of the present invention, generating a lane classification further includes comparing the color and the shape of the plurality of lane markers to a library of colors and shapes of known lane markers.

In yet another aspect of the present invention, generating a lane distance estimate further includes mathematically interpolating from the visual data the distance from a lane edge relative to a reference position on the host vehicle.

In yet another aspect of the present invention, the V2V network includes at least one remote V2V equipped vehicle.

In yet another aspect of the present invention, the method includes scanning a predetermined area for remote V2V equipped vehicles within a predefined range of the host vehicle.

In yet another aspect of the present invention, transmitting the lane model and confidence level further includes periodically transmitting the lane model and confidence level over the V2V network.

In yet another aspect of the present invention, transmitting the lane model and confidence level further includes transmitting the lane model and confidence level immediately upon determining that the remote V2V equipped vehicle is within the predefined range of the host vehicle.

In yet another aspect of the present invention, a method of generating and communicating lane information from a host to data vehicle-to-vehicle (V2V) network includes optically scanning a predefined area of road surface surrounding the host vehicle. The method further includes tracking a plurality of lanes. The method also includes detecting remote V2V equipped vehicles. The method also includes encoding information about the plurality of lanes into a mathematical lane model and communicating the mathematical model over the V2V network.

In yet another aspect of the present invention, optically scanning further includes collecting optical data from a plurality of cameras mounted to the host vehicle.

In yet another aspect of the present invention, tracking a plurality of lanes further includes determining a position, a width, a curvature, a topography, a distance of each of the plurality of lanes relative to a reference position on the host vehicle, and a color and a shape of a plurality of lane markers for the plurality of lanes.

In yet another aspect of the present invention, tracking a plurality of lanes further includes comparing the color and the shape of the plurality of lane markers to a library of colors and shapes of known lane markers.

In yet another aspect of the present invention, detecting remote V2V equipped vehicles further includes transmitting V2V data packets and receiving V2V data packets sent by remote V2V equipped vehicles over the V2V network.

In yet another aspect of the present invention, communicating the mathematical lane model further includes encoding the mathematical lane model to create an encoded mathematical lane model that conforms to a communications protocol and transmitting the encoded mathematical lane model over the V2V network.

In yet another aspect of the present invention, a system for generating and communicating lane information from a host vehicle to a vehicle-to-vehicle (V2V) network includes a camera. The system further includes a V2V sub-system having a receiver and a transmitter. The system further includes a controller in communication with the camera and the V2V sub-system, the controller having memory for storing control logic and a processor configured to execute the control logic. The control logic further includes a first control logic for collecting visual data from the camera. The control logic further includes a second control logic for detecting a lane within the visual data. The control logic further includes a third control logic for generating a lane classification for the lanes based on the visual data. The control logic further includes a fourth control logic for assigning a base confidence level to the lane classification. The control logic further includes a fifth control logic for generating a lane distance estimate from the visual data. The control logic further includes a sixth control logic for generating a base lane model from the lane classification and the lane distance estimate. The control logic further includes a seventh control logic for generating a formatted lane model and a formatted confidence level. The control logic further includes an eighth control logic for selectively transmitting the formatted lane model and the confidence level to the V2V network.

In yet another embodiment of the present invention, the camera includes a plurality of cameras attached to the host vehicle.

In yet another embodiment of the present invention, the base and formatted lane models include lane positioning, lane markings, lane curvature, speed, and trajectory data for the host vehicle.

In yet another embodiment of the present invention, the seventh control logic further includes aligning the base lane model and base confidence level to a standardized communications protocol.

In yet another embodiment of the present invention, the selectively transmitting further includes periodically transmitting the formatted lane model and formatted confidence level over the V2V communications network and when a V2V equipped vehicle appears within a predefined range of the host vehicle, automatically transmitting the formatted lane model and formatted confidence level over the V2V communications network.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses.

Figure 1:
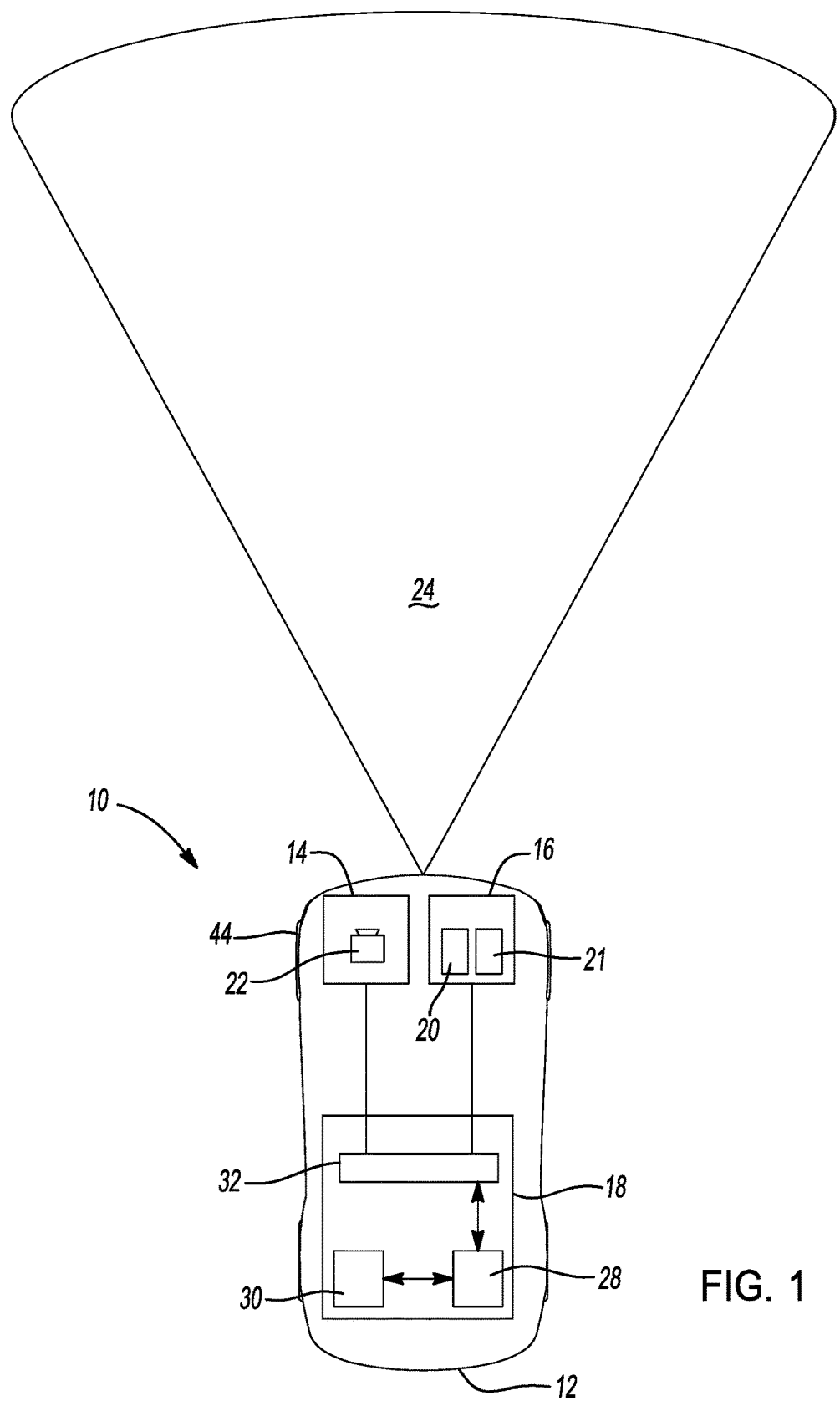
FIG. 1 is a schematic diagram of an exemplary motor vehicle having a system for generating and communicating lane information.
Figure 2:
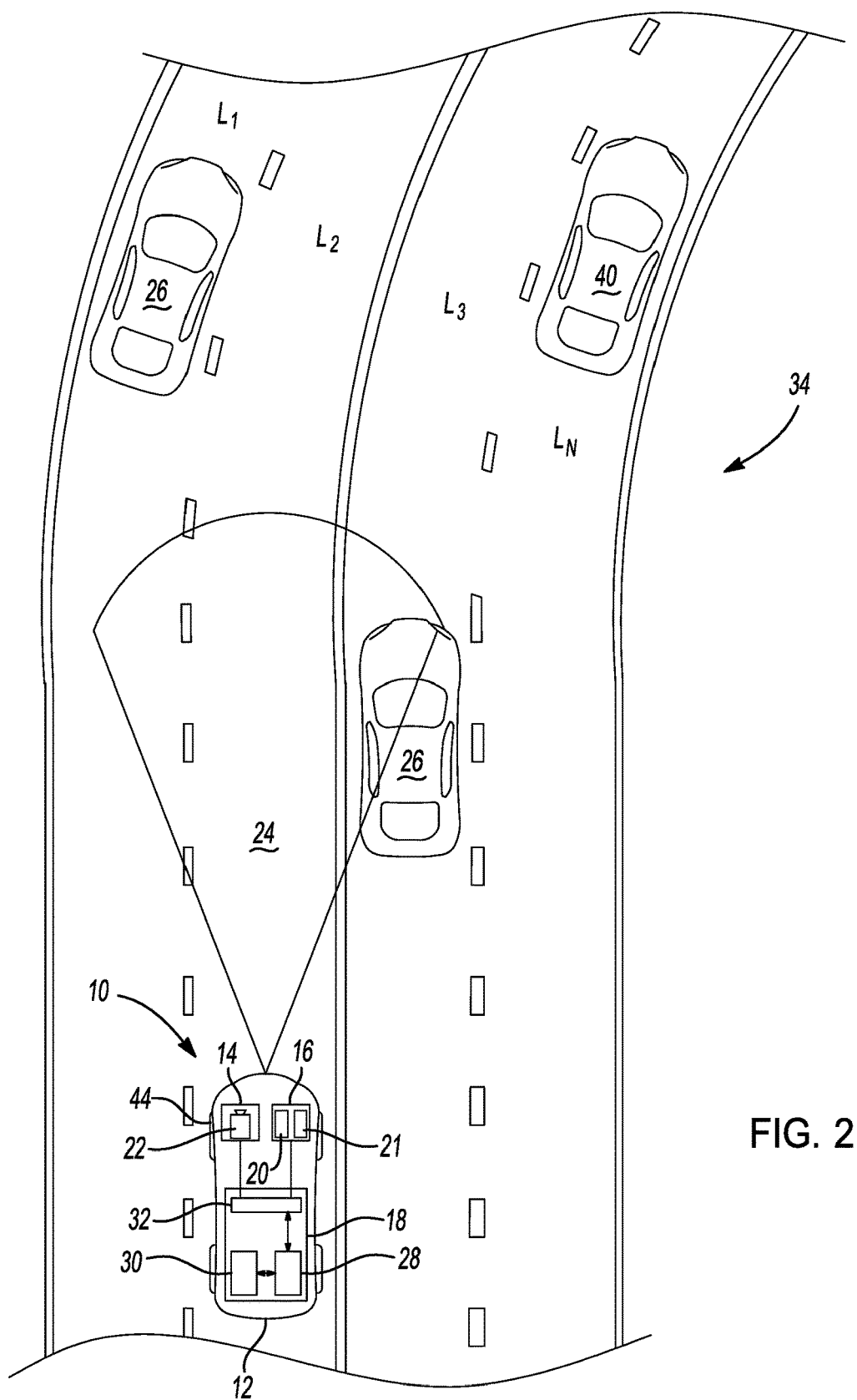
FIG. 2 is a schematic diagram of the motor vehicle on an exemplary road segment.

With reference to FIGS. 1 and 2, a system and method for generating and communicating camera and lane position information is generally indicated by reference to lane position system 10. The system 10 is used with a host vehicle 12 having a vision sub-system 14 and a vehicle-to-vehicle (V2V) communication sub-system 16. The vision sub-system 14 and the V2V communication sub-system 16 are in communication with a controller 18.

The vision sub-system 14 includes one or more optical sensors or cameras 22. The camera 22 is operable to collect visual information in a predefined field of view 24 surrounding the host vehicle 12. In the example provided, the camera 22 is illustrated as a front facing camera with a field of view 24 projected in a forward arc relative to the host vehicle 12. However, it should be appreciated that the vision sub-system 14 may include a plurality of cameras, including surround-view cameras, rear facing cameras, etc. Visual data from the camera 22 is communicated to the controller 18.

The V2V sub-system 16 includes a transmitter 20 operable to transmit wireless data from the V2V sub-system 16 of the host vehicle 12. The V2V sub-system 16 may also include a receiver 21 operable to receive wireless data sent by remote V2V equipped vehicles over the V2V communications network or by vehicle-to-infrastructure systems. As will be described below, the V2V data transmitted by the transmitter 20 may include GPS data, camera data, and/or object lists.

The controller 18 is a non-generalized, electronic control device having a preprogrammed digital computer or processor 28, memory or non-transitory computer readable medium 30 used to store data such as control logic, instructions, image data, lookup tables, etc., and a plurality of input/output peripherals or ports 32. The processor 28 is configured to execute the control logic or instructions. The controller 18 may have additional processors or additional integrated circuits in communication with the processor 28, such as perception logic circuits for analyzing the visual data or dedicated V2V circuits. Alternatively, the functions of the controller 18 may be distributed across the vision sub-system 14 and/or the V2V sub-system 16.

Figure 3:
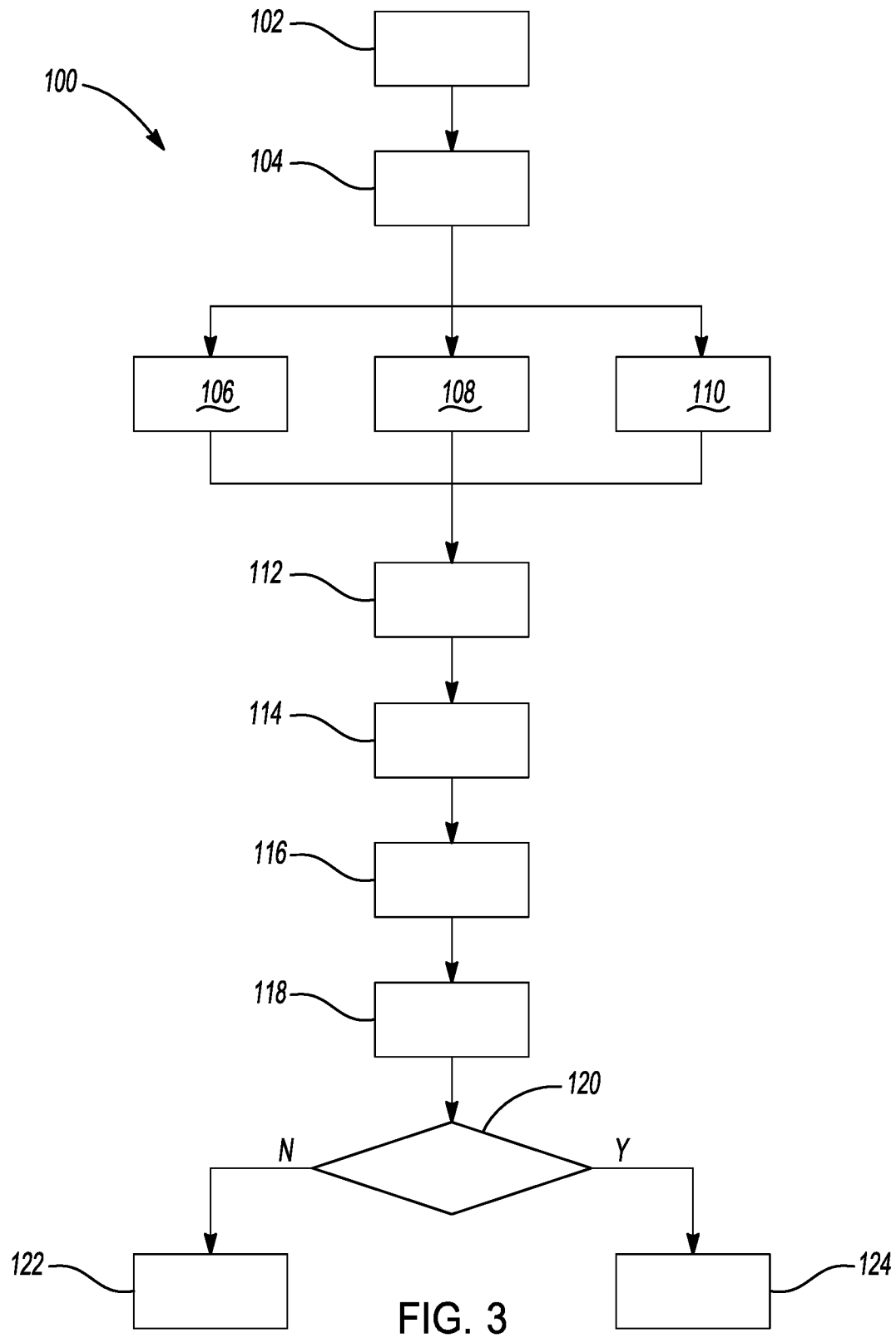
FIG. 3 is a system diagram illustrating a method of generating and communicating lane information.

Turning now to FIG. 3, and with continued reference to FIGS. 1 and 2, a method for generating and communicating camera and lane position information is generally indicated by reference number 100. For illustrative purposes, the method 100 will be described with the host vehicle 12 operating on an exemplary road segment 34, shown in FIG. 2. The road segment 34 has lanes $L_1$, $L_2$, $L_3$, to $L_n$. It should be appreciated that the road segment 34 may have as few as one lane without departing from the scope of the present disclosure. The lanes $L_1$ to $L_n$ are defined by lane markings 36. The lane markings 36 may be reflective paint, reflectors, traffic cones or barrels, grooves, etc. Additionally, the lane markings 16 may be solid lines, dashed lines, dashed and solid lines, or any other type of lane marking 36. The road segment 34 is illustrated as being partially curved but may have any shape and have any topography without departing from the scope of the present disclosure.

In the present example, the road segment 34 is populated with two remote V2V equipped vehicles 26, and one non-communicative vehicle 40. It should be appreciated that the road segment 34 may be populated by any number and combination of remote V2V equipped vehicles 26 and non-communicative vehicles 40. The non-communicative vehicles 40 may be vehicles without V2V systems or may be remote V2V equipped vehicles 26 that are disposed outside a communication range of the host vehicle 12.

The method 100 begins at block 102 where the camera 22 continuously captures visual data of the road segment 34 and sends the visual data to the controller 18. The visual data may be in a forward arc or a surround view relative to the host vehicle 12, depending on the number and type of cameras 22 mounted on the host vehicle 12. In the present example, the visual data includes the lane markings 36 for the portion of the road segment 34 within the field of view 24 of the camera 22. At block 104 the controller 18 processes the visual data for any possible lane markings 36 identifiable within the visual data. In one aspect, to detect the presence of lane markings 36 within the visual data, the controller 18 compares an optical intensity profile of the visual data to a library of known optical intensity profiles for known lane markings 36. The optical intensity profiles may include information about lane marking width, periodicity, direction relative to the host vehicle 12, color, curvature, etc. Additionally, the library includes reference information corresponding to road markings that are not lane markings 36. In one aspect, the reference information includes optical intensity profiles corresponding to pedestrian crosswalks, parking space markings, roadwork markings, etc.

At block 106, the controller 18 continuously generates a base lane classification from the visual data processed at block 104. The base lane classification is based on the comparison of any lane markings 36 identified within the visual data to the data in the library of known lane markings 36. In an example, the base lane classification indicates that a lane marking 36 corresponding to one or more of the lanes $L_1$ to $L_n$, is a dashed line, a dashed and solid line, a solid line, or a double solid line, etc. The base lane classification further includes information about lane width, lane density, road curvature, and lane marking 36 color.

A base lane tracking list is generated at block 108 from the visual data processed at block 104. The base lane tracking list includes a count of the lanes detected within the visual data by the controller 18. In the example of FIG. 2, the base tracking list includes lanes $L_1$ to $L_n$, wherein n=4, indicating that four lanes have been detected, though it should be understood that the base tracking list may include any lanes $L_1$ to $L_n$ within the field of view 24 from the camera 22. Thus, the base tracking list may include all of the lanes $L_1$ to $L_n$ in the road segment 34, or only a portion of the lanes $L_1$ to $L_n$ in a road segment.

At block 110, a base lane classification confidence level is generated. To generate the base lane classification confidence level, the controller 18 determines a level of similarity between the lane markings 36 detected within the visual data to the reference lane markings 36 within the library. For lane markings 36 with a high degree of similarity to the reference lane markings 36 within the library, a high base confidence level is assigned. For lane markings 36 with a low degree of similarity to the reference lane markings 36, a low base confidence level is assigned. It should be appreciated that the base confidence level may be based on a continuum. For example, a solid line lane marking 36 within the visual data that has been heavily damaged by erosion, or that has been partially covered by skid-marks from tires may approximate the periodicity of the dashed paint of a dashed lane marking 36. In this example, the base lane classification may be assigned a low base lane confidence level. However, with further reference to the example, because the lane markings 36 are continuously captured by the visual data from the camera 22, as the host vehicle 12 travels along the road segment 34, the damaged lane marking 36 may exhibit less damage at some points along its length than at other points. For the less damaged sections of the lane marking 36 of the example, the controller 18 may assign a high base lane confidence level, indicating a high probability that the lane marking 36 is a solid line.

While the processes of blocks 106, 108, and 110 are discussed as occurring in a particular sequence, it should be appreciated that any of the processes described as occurring within blocks 106, 108, and 110 may be performed independently of one another, and in any order.

At block 112, the controller 18 uses the base lane classifications, base lane tracking list, and/or base lane classification confidence levels to estimate a distance of each of the lanes L to $L_n$ from a reference position 44 on the host vehicle 12. In the example provided, the reference position 44 is an edge of a tire, though it should be appreciated that any reference position may be used. To determine the estimated distance of each of the lanes $L_1$ to $L_n$ from the reference position 44 on the host vehicle 12, the controller extrapolates an extent of the lane markings 36 from the visual data. That is, because the visual data from the cameras 22 is limited to the predefined area 24 surrounding the host vehicle 12, the road markings 36 extend beyond a field of view of the cameras 22. Thus, in order to accurately determine a position of the road markings 36, the controller 18 extrapolates from the position of the host vehicle 12 on the road segment 34, and from the visual data, a predicted position of the road markings 36. In one aspect, in addition to using the visual data, and the base lane classifications, base lane tracking list, and base lane confidence levels, the controller 18 compiles the position of the host vehicle 12, an angular position of a steering wheel of the host vehicle 12, a speed of the host vehicle 12, etc. to extrapolate the predicted position of the road markings 36 relative to the reference position 44 on the host vehicle. At block 114, the controller 18 combines the base lane classifications, base lane tracking list, and base lane confidence levels into a lane model. The lane model is a numerical formulation of the lanes detectable by the host vehicle 12 and the relationship of the host vehicle 12 to the lanes.

At block 116 the controller 18 retrieves V2V data from receiver 21 of the V2V sub-system 16. The V2V data includes information about remote V2V equipped vehicles 26 within a predetermined range. For example, the remote V2V equipped vehicles 26 may be within a predetermined one kilometer radius of the host vehicle 12, whereas the non-communicative vehicle 40 may be outside the predetermined one-kilometer radius of the host vehicle. Additionally, the controller 18 selectively chooses which, if any, of the remote V2V equipped vehicles 26 within the predetermined range of the host vehicle 12 to designate as target vehicles 46. In an aspect, the target vehicles 46 of the remote V2V equipped vehicles 26 are those remote V2V equipped vehicles 26 for which the visual data collected by the host vehicle 12 is relevant. For example, the target vehicles 46 may be traveling along the same road segment 34 as the host vehicle 12, in the same direction, and/or the target vehicles 46 may be traveling along a course and heading that intersects with the course and heading of the host vehicle 12. It should be understood that while in FIG. 2, two target vehicles 46 are depicted along the road segment 34, there could be any number of target vehicles 46, including zero target vehicles 46.

At block 118 the lane model data is aligned to the standardized V2V communications protocol. The standardized V2V communications protocol includes limitations on the size of data packets transmitted over the V2V communications network, as well as limitations on the types of data and the frequency with which the data may be transmitted. Each of the data packet size, data type and frequency with which the data is transmitted is limited to prevent the V2V communications network from becoming overloaded or otherwise inoperative.

At block 120, the controller 18 determines for which of any target vehicles 46 detected the lane model is relevant. To determine for which of the target vehicles 46 the lane model is relevant, the controller 18 analyzes the lane model with respect to locational information retrieved by the V2V sub-system 16 about each of the target vehicles 46. The locational information may include global positioning system (GPS) location information, heading information, speed information, etc. pertaining to each of the target vehicles 46. Additionally, the locational information may include lane position information including lane density, lane width, road curvature, lane marking color, and other information pertaining to the lanes in which the target vehicles 46 are operating. If the controller 18 determines that no target vehicles 46 have been identified, the method proceeds to block 122 where the controller 18 commands the transmitter 20 of the V2V sub-system to periodically transmit a basic safety message (BSM) and the lane model to the V2V communications network. The BSM includes information such as GPS location, heading, speed, etc. for the host vehicle 12. The periodicity with which the BSM and lane model are transmitted is defined by a standardized V2V communications protocol wherein the frequency with which the BSM and lane model is transmitted is limited to prevent the V2V communications network from becoming overloaded or otherwise inoperative. For example, the frequency with which the BSM and lane model are transmitted may be once per second.

However, if target vehicles 46 are identified by the controller 18, the method proceeds to step 124 where the controller 18 commands the transmitter 20 to transmit the BSM and the lane model to the target vehicles 46 immediately as they are identified. That is, while the system 10 transmits the BSM and the lane model at a predetermined frequency, when a target vehicle 46 is first identified, or when a request for information is received from the target vehicle 46, the BSM and the lane model are transmitted immediately to the target vehicle 46 as well.

By generating and transmitting lane information that is detected by imaging sensors, the system 10 allows for the accurate mapping of surrounding vehicles within lanes. The lane information may then be used by advanced driver assistance systems to provide increased levels of autonomous driving.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of generating and communicating lane information from a host vehicle to a vehicle-to-vehicle (V2V) network, the method comprising:
   collecting visual data from a camera;
   detecting a lane within the visual data;
   generating a lane classification for the lane based on the visual data;
   assigning a confidence level to the lane classification;
   generating a lane distance estimate from the visual data;
   generating a lane model from the lane classification and the lane distance estimate;
   scanning a predetermined area for remote V2V equipped vehicles within a predefined range of the host vehicle; and
   transmitting the lane model and the confidence level to the V2V network immediately upon determining that the remote V2V equipped vehicle is within the predefined range of the host vehicle.

2. The method of claim 1 wherein the camera comprises a front camera mounted to a front-facing surface of the host vehicle.

3. The method of claim 1 wherein the detecting a plurality of lanes further comprises determining a position, a width, a curvature, a topography, a distance of each of the plurality of lanes relative to a reference position on the host vehicle, and a color and a shape of a plurality of lane markers for the plurality of lanes.

4. The method of claim 3 wherein the generating a lane classification further comprises comparing the color and the shape of the plurality of lane markers to a library of colors and shapes of known lane markers.

5. The method of claim 1 wherein the generating a lane distance estimate further comprises mathematically interpolating from the visual data the distance from a lane edge relative to a reference position on the host vehicle.

6. The method of claim 1 wherein the V2V network includes at least one remote V2V equipped vehicle.

7. The method of claim 1 wherein transmitting the lane model and confidence level further comprises periodically transmitting the lane model and confidence level over the V2V network.

8. A method of generating and communicating lane information from a host to data vehicle-to-vehicle (V2V) network, the method comprising:
   optically scanning a predefined area of road surface surrounding the host vehicle;
   tracking a plurality of lanes;
   detecting target V2V equipped vehicles;
   encoding information about the plurality of lanes into a mathematical lane model;
   determining for which of any target vehicles the mathematical lane model is relevant; and
   communicating the mathematical model over the V2V network to the relevant target vehicles immediately as the relevant target vehicles are identified.

9. The method of claim 8 wherein the optically scanning further comprises collecting optical data from a plurality of cameras mounted to the host vehicle.

10. The method of claim 9 wherein the tracking a plurality of lanes further comprises determining a position, a width, a curvature, a topography, a distance of each of the plurality of lanes relative to a reference position on the host vehicle, and a color and a shape of a plurality of lane markers for the plurality of lanes.

11. The method of claim 10 wherein the tracking further comprises comparing the color and the shape of the plurality of lane markers to a library of colors and shapes of known lane markers.

12. The method of claim 8 wherein the detecting target V2V equipped vehicles comprises transmitting V2V data packets and receiving V2V data packets sent by remote V2V equipped vehicles over the V2V network.

13. The method of claim 12 wherein the communicating the mathematical lane model further comprises encoding the mathematical lane model to create an encoded mathematical lane model that conforms to a communications protocol and transmitting the encoded mathematical lane model over the V2V network.

14. A system for generating and communicating lane information from a host vehicle to a vehicle-to-vehicle (V2V) network, the system comprising:
   a camera;
   a V2V sub-system having a receiver and a transmitter;
   a controller in communication with the camera and the V2V sub-system, the controller having memory for storing control logic and a processor configured to execute the control logic, the control logic including a first control logic for collecting visual data from the camera, a second control logic for detecting a lane within the visual data, a third control logic for generating a lane classification for the lanes based on the visual data, a fourth control logic for assigning a base confidence level to the lane classification, a fifth control logic for generating a lane distance estimate from the visual data, a sixth control logic for generating a base lane model from the lane classification and the lane distance estimate, a seventh control logic for generating a formatted lane model and a formatted confidence level, an eighth control logic for determining for which of any target vehicles the formatted lane model is relevant by analyzing the formatted lane model with respect to locational information retrieved by the V2V sub-system about each of the target vehicles, the locational information including global positioning system (GPS) location information, heading information, and speed information, and a ninth control logic for immediately transmitting the formatted lane model and the confidence level to the relevant target vehicles in the V2V network.

15. The system of claim 14 wherein the camera comprises a plurality of cameras attached to the host vehicle.

16. The system of claim 15 wherein the base and formatted lane models comprise lane positioning, lane markings, lane curvature, speed, and trajectory data for the host vehicle.

17. The system of claim 16 wherein the seventh control logic further comprises aligning the base lane model and base confidence level to a standardized communications protocol.

18. The method of claim 1 further comprising:

determining which of the remote vehicles in the V2V network the lane model is relevant by analyzing the lane model with respect to locational information about each of the remote vehicles, wherein the locational information may include global positioning system (GPS) location information, heading information, or speed information pertaining to each of the remote vehicles, and wherein transmitting the lane model and the confidence level to the V2V network immediately upon determining that the remote V2V equipped vehicle is within the predefined range of the host vehicle includes immediately transmitting the lane model and the confidence level to the relevant remote vehicles.

19. The method of claim 8 wherein determining for which of any target vehicles the mathematical lane model is relevant includes analyzing the mathematical lane model with respect to locational information about each of the target vehicles, the locational information including global positioning system (GPS) location information, heading information, and speed information.

* * * * *